Sept. 2, 1969            R. H. SUTTER            3,464,677
FOUNDRY SAND MIXER SYSTEM
Filed Aug. 30, 1967            7 Sheets-Sheet 4
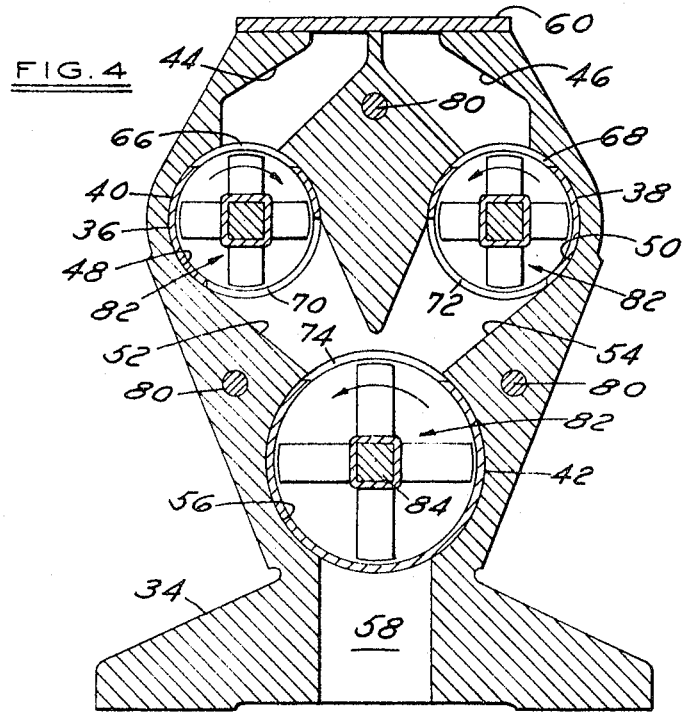
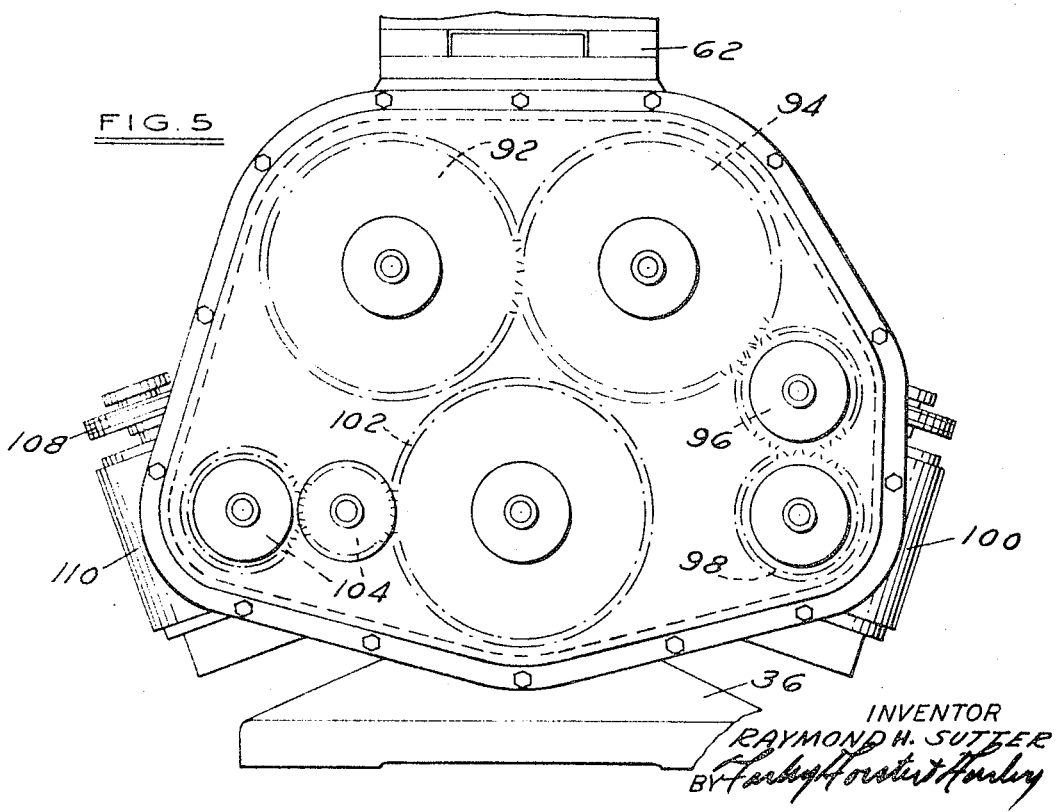
INVENTOR
RAYMOND H. SUTTER
BY
ATTORNEYS

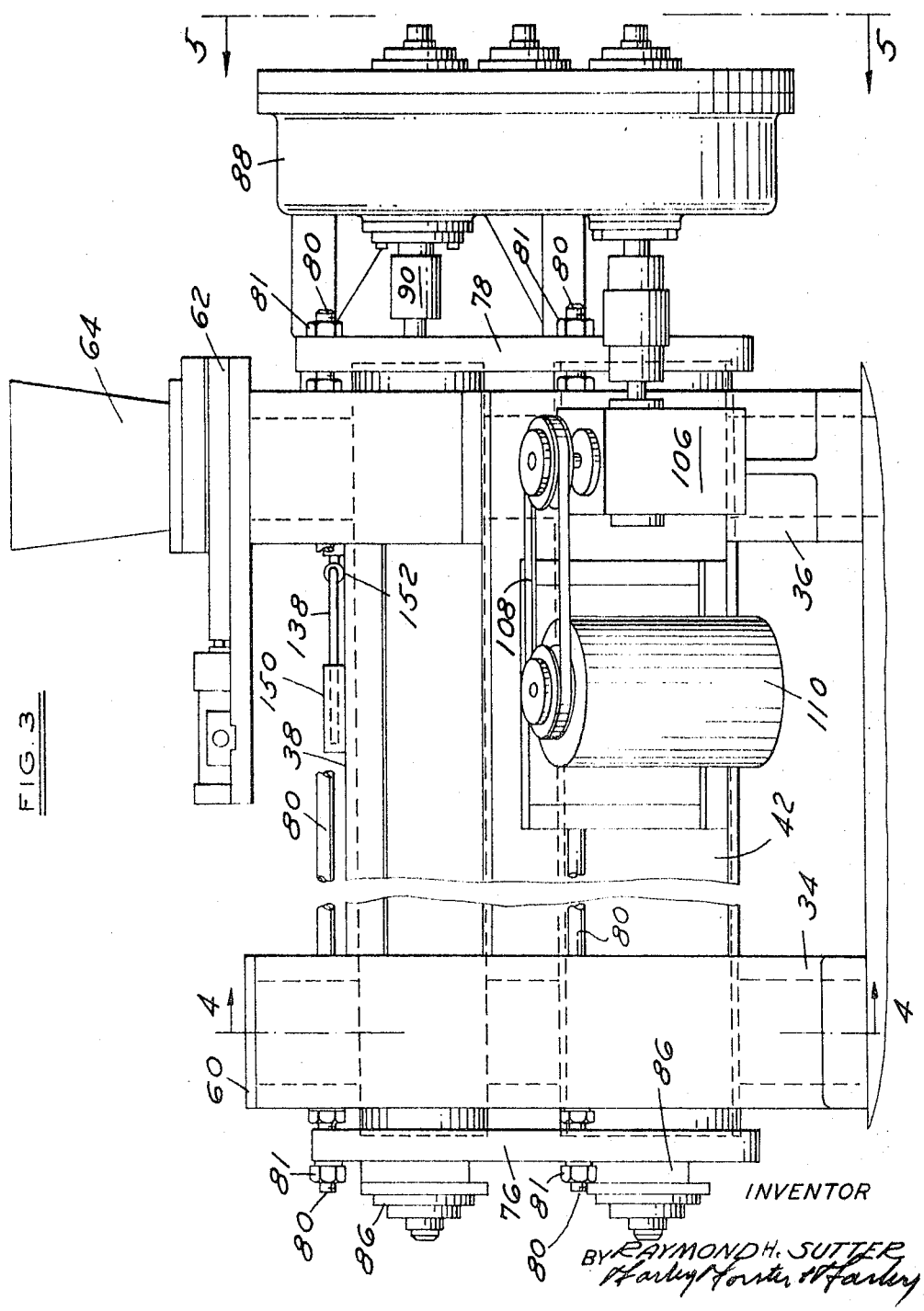

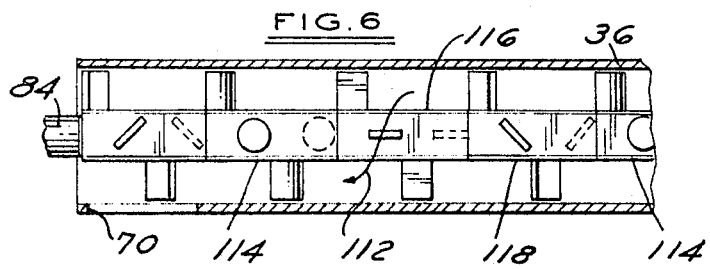
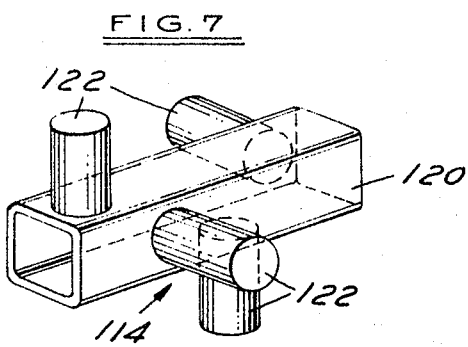
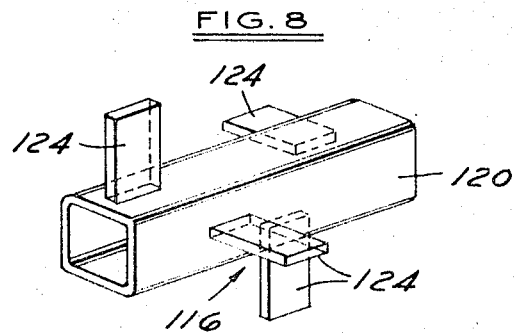
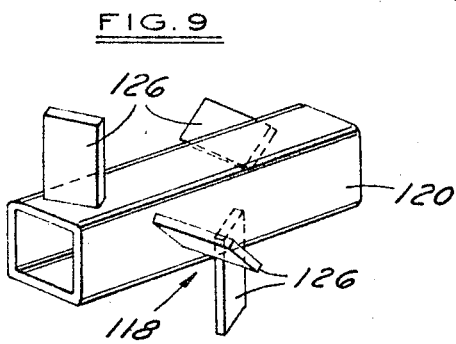

Sept. 2, 1969     R. H. SUTTER     3,464,677
FOUNDRY SAND MIXER SYSTEM
Filed Aug. 30, 1967     7 Sheets-Sheet 6

INVENTOR
RAYMOND H. SUTTER
BY Harley, Horster & Harley

ATTORNEYS 3,464,677
FOUNDRY SAND MIXER SYSTEM
Raymond H. Sutter, Fenton, Mich., assignor to Sutter
Products Company, a corporation of Michigan
Filed Aug. 30, 1967, Ser. No. 664,551
Int. Cl. B28c 7/10
U.S. Cl. 259—154                                    15 Claims

ABSTRACT OF THE DISCLOSURE

A sand-resin-catalyst mixer for individual foundry core making machine installation employing separate sand-resin and sand-catalyst screw feed mixing tubes discharging into a common sand-resin-catalyst screw feed final mixing tube discharging into an individual machine hopper having sand level sensing controls adapted to automatically start and stop mixing in response to low and high levels together with individually adjustable resin and catalyst proportioning pumping systems actuated simultaneously with demand responsive sand infeed.

Background of the invention

Most foundries prepare all of the resin coated core sand used by all of their equipment at one location and transport it to the different machines for use as needed. This requires mixing large batches using large mullers for long periods of time to obtain a uniform consistency without balling; requires using a sand-resin-catalyst blend which is a compromise of what is best for the different types of cores made by the different machines, and with a long enough bench life to enable transporting it to the farthest disposed piece of equipment, or otherwise last to use the sand from a given batch which in turn means limited production rates for all of the foundry equipment based on the curing time of such material; and means reserve supplies, or a shutdown of the whole foundry when repairs have to be made to the core sand mixing equipment.

Once the sand batch is mixed it must be stored in order that another mix can be started and requires further handling and equipment to transport it to the different core making machines where it must also be kept in some reserve. The transportation of pre-mixed core sand is more difficult than loose dry sand which can flow more freely.

Furthermore, the development of newer faster setting resins for use in making core sands with improved production rates requires that the sand be used more promptly after mixing than is possible with central batch type mixing and supply systems. However, at the same time, the cost of labor and the equipment presently available has seemed to preclude the individual attention that is important in providing just the right amount of the right blend of core sand to make the best cores in foundries of any major size and capacity.

Summary of the invention

This invention is directed to an improvement in foundry core sand mixing equipment and more particularly to a means and method for demand responsive custom mixing and blending core sand, resin and catalyst in accord with the particular requirements of one or adjacent machines, in close proximity, to provide high quality cores with the fast curing time for high production rates.

Foundry sands and resins are mixed at the machines which will use them in direct response to individual machine demand for the amount of core sand it will require. The resins, or resin and catalyst, are separately mixed with the sand and are blended together just prior to being supplied to the core making machine so that fast curing materials may be used.

The proportionate amounts of sand and resin or sand and catalyst may be closely controlled so that the final blend suits the type of core being made and once this is accomplished the operation is fully automatic in response to the requirements of the core making equipment being mixed and blended as it is used.

The embodiment of this invention hereinafter described, and which is shown by the drawings, includes a compact arrangement of separate horizontal tube mixers mounted directly on a core blowing machine in which are provided feed screws for mixing and blending the core sand ingredients and delivering it to the small feed hopper for core making use. Dry sand is supplied to separate upper resin and catalyst pre-mixing tubes which discharge into a third lower final blending and mixing tube which discharges directly into the individual machine hopper. Level sensing means in the feed hopper operatively connected to response means which control the supply of the sand and resins to the mixer, provide a direct accurately proportioned individual machine supply and demand system.

The core sand mixing equipment of this invention is of relatively simple and economical construction in that the supports for the mixer tubes include passageways for interconnecting them, they are interchangeable for use in conveying sand from either end towards the other, the bearing supports for the feed screws which are used are protected in the manner in which they are mounted on the supports and the whole assembly may be easily dismantled for cleaning, repairs and/or changing the rate of delivery and extent of mixing by means of stacked sets of impeller blades of optional design and arrangement.

These and other objects and advantages will be better appreciated upon reading the detailed description which follows a brief reference to the accompanying drawings.

Description of the drawings

FIGURE 3 is an enlarged side elevation of the core sand mixing equipment of this invention.

FIGURE 4 is a cross-section view through one of the support castings for the equipment taken along the line 4—4 of FIGURE 3 shown in the last mentioned drawing.

FIGURE 5 is an end view taken along the line 5—5 of FIGURE 3.

FIGURE 6 is a fragmentary open cross section of one of the tube mixer members.

FIGURES 7-9 are isometric views of three different types of mixing and impeller blades.

Detailed description of the invention

Figure 1:
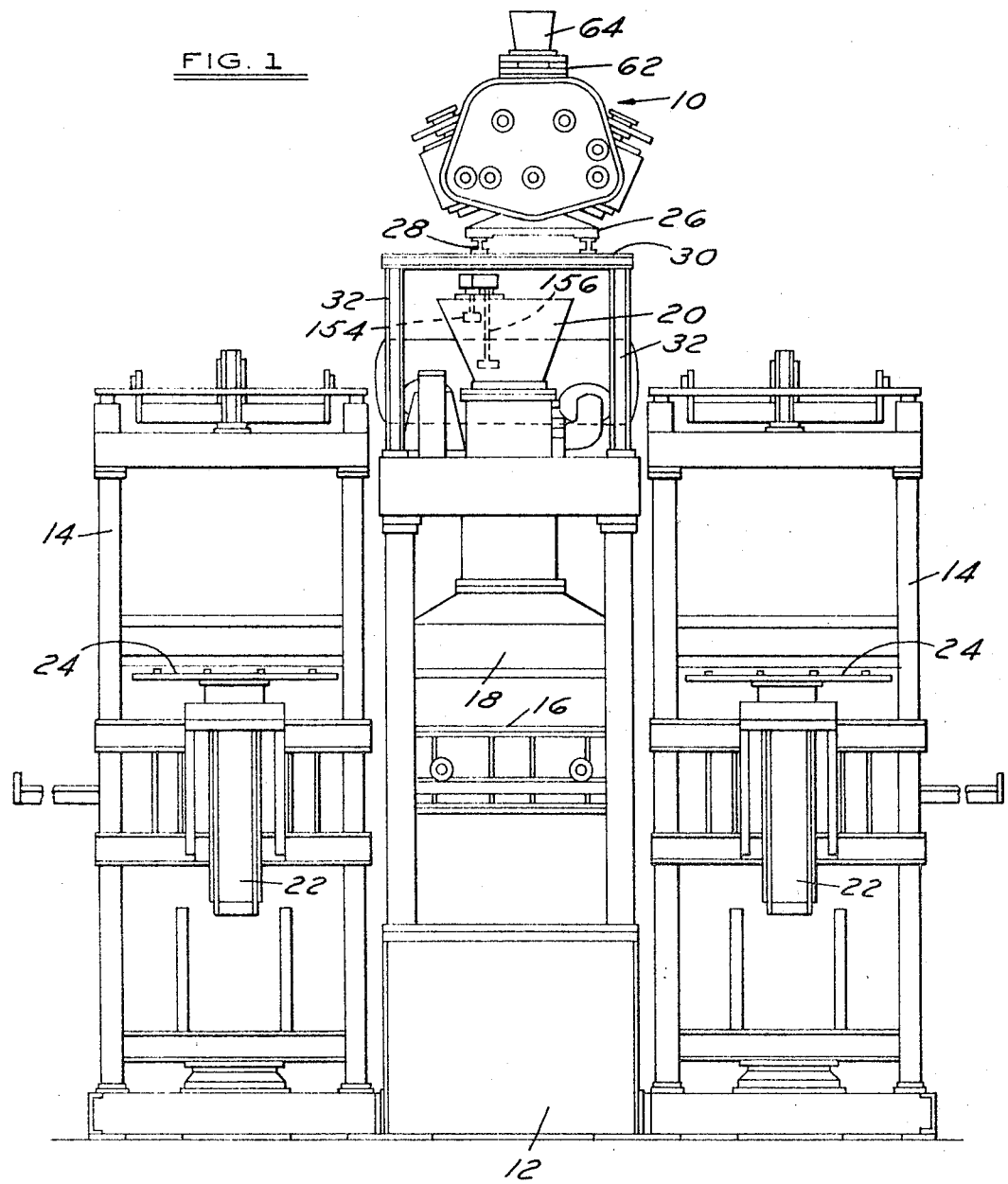
FIGURE 1 is a front elevation of a core sand blower including the demand sand mixing and supply system of this invention.
Figure 2:
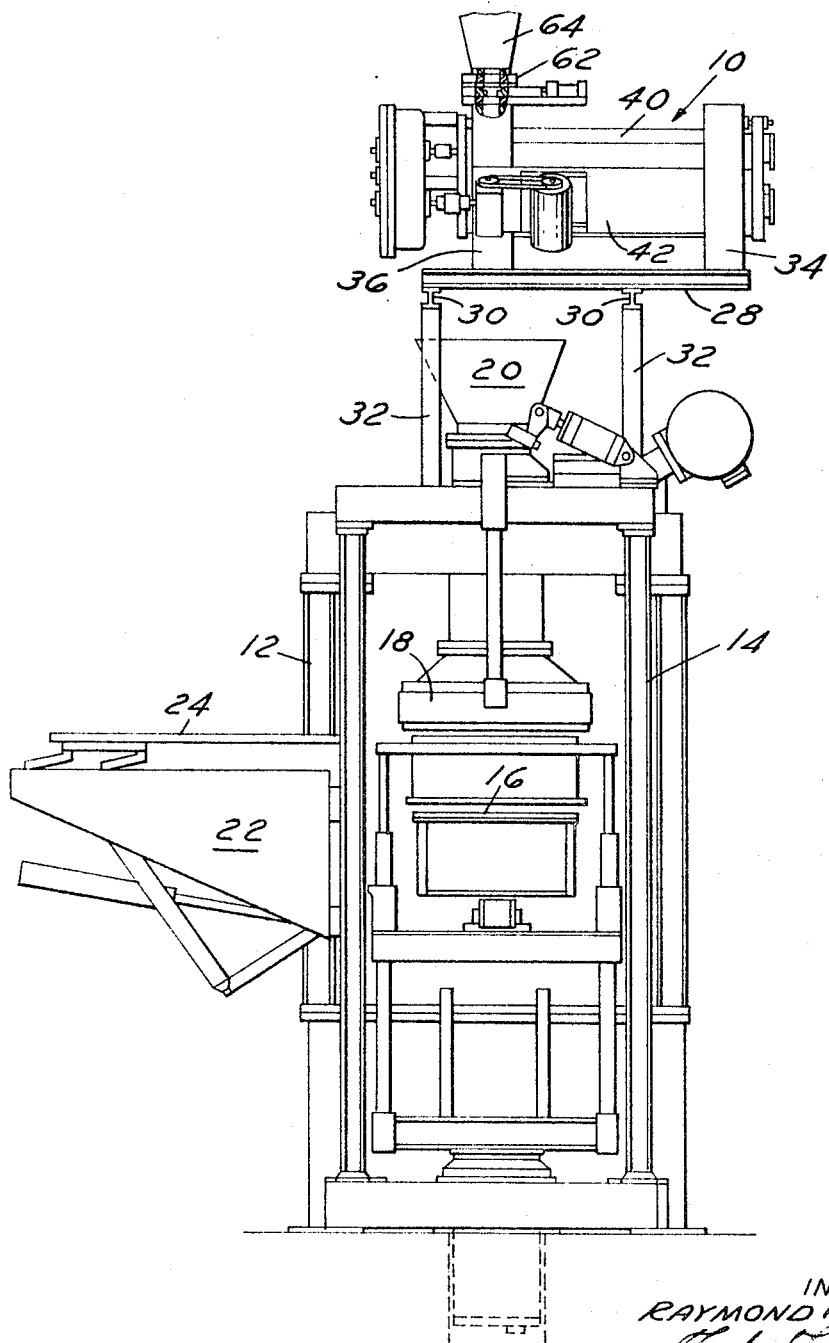
FIGURE 2 is a side elevation of the equipment shown in the first drawing figure.

The core sand mixing and blending equipment 10 of this invention is shown in the first two drawing figures mounted for use on a core blowing machine 12 which includes alternately operative curing and stripping stations 14 on either side of a central blow station.

The core blower 12 includes a lift table 16 on which cope and drag sections of a core box are placed and by which they are raised into blowing position relative to a blow head 18 in communication with a feed hopper 20 just under the sand mixing and blending equipment.

After the cores are blown, they are shifted alternately to left and right into the curing and stripping stations 14 where the cope and drag sections are parted sufficiently for a take-off mechanism 22 to move a transfer unit 24 between them and to remove the sand cores that have been cured and stripped from the core boxes.

The equipment shown is for hot box cores but as the discussion proceeds it will be appreciated that the present invention may be used on various other types of sand core or shell mold forming equipment which has a continuing demand for resin-coated sand blended with other resin or catalyst to its particular requirements.

Referring more closely to the sand mixing and blending equipment 10, it is shown as provided on an open frame 26, including cross beams 28 and 30, supported by stantions 32, in spaced relation over the core blowing equipment 12 and with one end relatively over the feed hopper 20. As best shown by FIGURES 3–5, it includes two castings 34 and 36 which are spaced apart and form supports for three cylindrical mixing tubes 38, 40 and 42.

The two support castings 34 and 36 are alike in order to accommodate a reverse arrangement as later described as well as and as best shown by FIGURE 4 include passageways 44 and 46 which separately communicate with transverse openings 48 and 50 through the castings and through which the upper two tubular members, 38 and 40, extend. They also include passageways 52 and 54 which converge back together and are in communication with a transverse opening 56 for the third larger tubular member 42 and a passageway 58 that leads from the opening 56 through the bottom of the casting.

In use, one of the support castings 34 has a cover plate 60 over the first two passageways 44 and 46 and the other includes a chop-gate control valve 62 with a sand reservoir or hopper 64 disposed thereover.

The tubular members 38 and 40 are provided with openings 66 and 68, near the ends thereof which are received through the openings 48 and 50 in the support 36, and which are aligned with the passageways 44 and 46 so that they may receive foundry sand from a reservoir hopper 64 provided therefor.

Near the opposite ends of the tubular members 38 and 40, within the other support casting 34, bottom openings 70 and 72 are provided which communicate with passageways 52 and 54 and in turn with an opening 74 in the larger and lower disposed tubular member 42.

The tubular member 42 has no opening in its underside for communication with the passageway 58 shown in the support casting 34 but does include such an opening at its opposite end which registers with a similar casting discharge opening through which the core making sand is finally delivered into the feed hopper 20 on the core blowing equipment.

The ends of the tubular passage members 38, 40 and 42 each extend beyond the outer faces of the support castings 34 and 36 and are collectively covered and closed by end cap plates 76 and 78 which are held thereon by tie rods 80 that extend the length of the passage members and are best shown in FIGURES 3 and 4. The end caps are spaced from the support castings 34 and 36 by lock nuts, as best shown at the ends of the assembly in FIGURE 3.

With the arrangement thus far described, it will be appreciated that either support casting may be used to receive foundry sand and to dispense the final blended mix, by changing the tubular passage members end-for-end and relocating the sand hopper and chop-gate, and that the tubular passage members may be readily opened at either end for such inspection cleaning and repair of the internal mechanism thereof which will now be described.

Within each of the tubular members 38, 40 and 42 there is provided a sand mixing and transferring feed screw 82, appropriately sized therefor, and which includes a center shaft 84 that is square within the passage members but has cylindrical end portions that extend through the end cap plates 76 and 78 for rotational support within bearings located outboard of the end plates and suitably spaced from the ends of the tubular members for due protection from the sand being mixed and moved therein. Such bearing supports 86 are shown in outboard spaced relation to the end cap plate 76, and at their other ends are mounted within a housing 88 for the feed screw drive mechanism, which is next described.

The bearing supports within housing 88 support shaft extensions connected to the shaft ends by couplings 90, and within the housing is provided gear trains for separately driving the feed screws in the upper tubular members 38 and 40 and the lower tubular member 42.

Intermeshing gear members 92 and 94 are provided for driving the feed screws in the upper tubular members synchronously in opposite rotational directions. They are in turn driven by a pair of pinion gears 96 and 98 through a right angle drive, mounted on the outside of the support casting 36, by a drive motor 100.

The feed screw in the lower disposed tubular member 42 includes a separate gear member 102, pinion gears 104, and a like angle drive 106 and belt connection 108 to another drive motor 110 mounted on the other side of the support casting 36.

The feed screws 80 in the respective tubular members are so constructed that their feed rates and the extent of mixing they provide may be varied by changing the arrangement of the sand mixing and impeller blades, as is best shown by reference to FIGURES 6–9.

A section of the tubular member 36 is shown in FIGURE 6, with the rotational direction of the feed screw depicted by the arrow 112, and wherein three different types of mixing and impeller blades are shown on the center shaft 84. These include the blade sets 114, 116 and 118 shown in FIGURES 6–9, respectively, each of which include a short square sectioned tubular collar 120, of a size fitting on the square sectioned part of the shaft 84 and which may be stacked in optional arrangements thereon.

The blade set 114 includes short cylindrical blade forms 122 progressively disposed in a helix arrangement on the different side faces of the collar 120. These are used to mix the sand, as they rotate and to cause some slight forward movement thereof due to the progressive helical disposition.

The blade set 116 includes rectangular shaped blades 124 axially and radially disposed on the side faces of their collar part 120, also in a helix arrangement, and serve principally as paddle blades to displace the sand circumferentially within the passage member with only slight axial movement to achieve more thorough mixing.

The blade set 118 has the same type of rectangular shaped blades 126 as those last described but has them angularly disposed on the sides of their collar part to provide a more rapid screw feed for moving the sand through the passage members in accord with whichever way they are turned.

It will be appreciated that the length of the tubular members is sufficient to stack several of the different blade sets on the drive shafts and that the variations used will provide varying degrees of movement and mixing. Moreover, the ease with which access is obtained through the end cap plates to change the blade sets enables varying the rate of movement and mixing as desired for different blends being mixed for different types of cores and making such inspections, cleaning and repairs as from time to time may be necessary.

Another advantage in the use of this type of feed screw is that the blade set at the output end of a passage member may be reversed, as is shown at the end in FIGURE 5, to hold the sand mix away from the end wall to better assure its passage through the side wall opening 70 and to further safeguard the bearing supports even though they are mounted well apart from the end wall closures.

As thus far described, it wil be seen that the sand mixing and blending apparatus 10, as mounted on the core blowing equipment 12, will dispense foundry core sand from the reservoir hopper 64, itself fed by any suitable sand conveyor means, to the two tubular passage members 38 and 40 where it is mixed and moved in one direction until it drops into the lower passage member 42 and that it is then further mixed and moved back in the opposite direction towards the dispensing passageway 58 from whence it falls into the core machine hopper 20. During the introduction and initial mixing of the sand in the passage members 38 and 40 the core sand forming resins and catalyst are added to the dry foundry sand.

Figure 10:
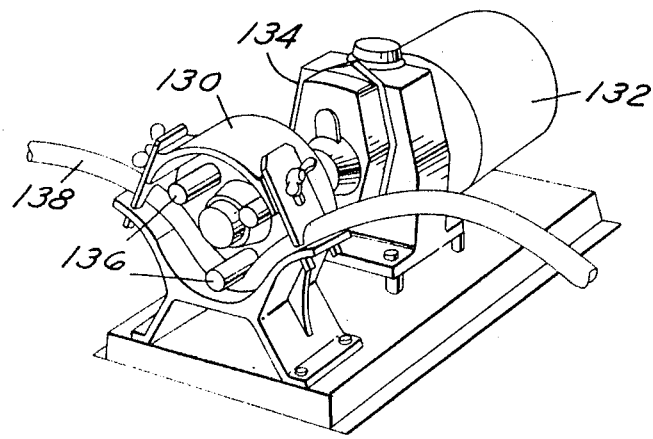
FIGURE 10 is a perspective view of a preferred resin or catalyst feed pump and its related operating mechanism.
Figure 11:
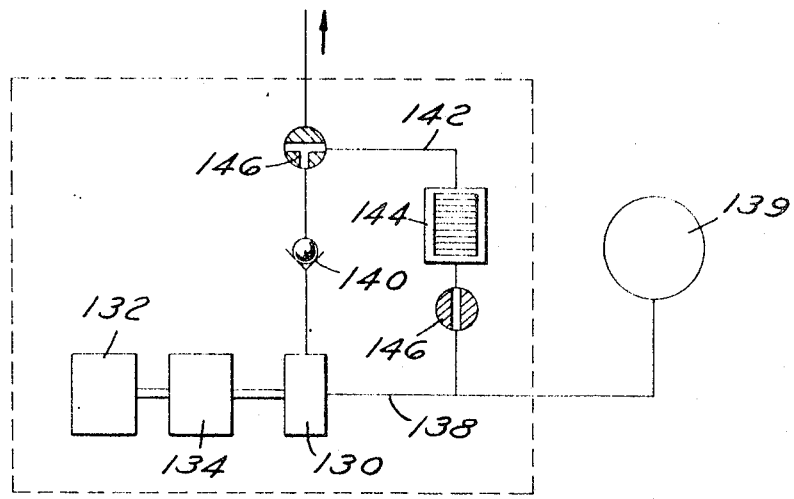
FIGURE 11 is a schematic of a fluid flow control system for resin or catalyst.

FIGURE 10 shows a peristaltic pump 130 of the type which may be used for supplying the resin and catalyst separately, in the sand mixing system disclosed. It includes a drive motor 132 which operates the pump through a speed changer 134 to vary the amount of resin or catalyst, as the case may be, that is supplied by the pump. The pumps operate by driving radially disposed roller members 136 which come in contact with a section of flexible tubing 138 and exert a squeezing action which causes a positive displacement of the fluid in the tubing in accord with the spacing of the rollers and their rotational speed.

FIGURE 10 shows a simple schematic diagram for the resin pumping system, which is the same for the catalyst, wherein the resin is pumped from the reservoir 139 to the tubing 138 through the pump section 130 and causes it to flow through a check valve 140 to its ultimate destination. A branch line 142 through a time-rate sight gauge 144 is also provided, with diverting manual valves 146 and 148, to enable measuring the rate of fluid that the system is providing followed by return of the measured fluid to the system.

In FIGURE 3, a fitting 150 is shown on one of the tubular members 38 with the discharge end of the tubing 138 disposed therein, for dispensing the fluid it carries into the sand being mixed as it passes through. Like fittings 150 are provided on each of the upper tubular members 38 and 40 and each is separately connected to a regulated pumping system for supplying proportioned amounts of resin and catalyst to the sand therein for separate premixing. As a consequence, reaction of resin and catalyst starting "shelf life" time does not begin until the resin and catalyst sand mixtures are blended in the lower disposed third tubular member 42 in the final mixing stage.

In a typical mixing and blending system for supplying 150 lb./min. of core sand to a core making machine, the two upper passage members will each process approximately 75 lb./min. and by keeping the catalyst separate in the premixing stage a more thorough mixing and coating of the sand grains with the resin can be obtained without coagulation and balling. Moreover, by having separate drive means for the feed screws in the upper and lower passage members, a reserve supply of premixed sand and resin, and sand and catalyst, may be held while the lower passage member is fully discharged as when down-time will be more than the "shelf life" of the blended mixtures.

This is of considerable importance since the faster setting resins have shorter "shelf life" and may lose substantial strength in a relatively short time.

Figure 12:
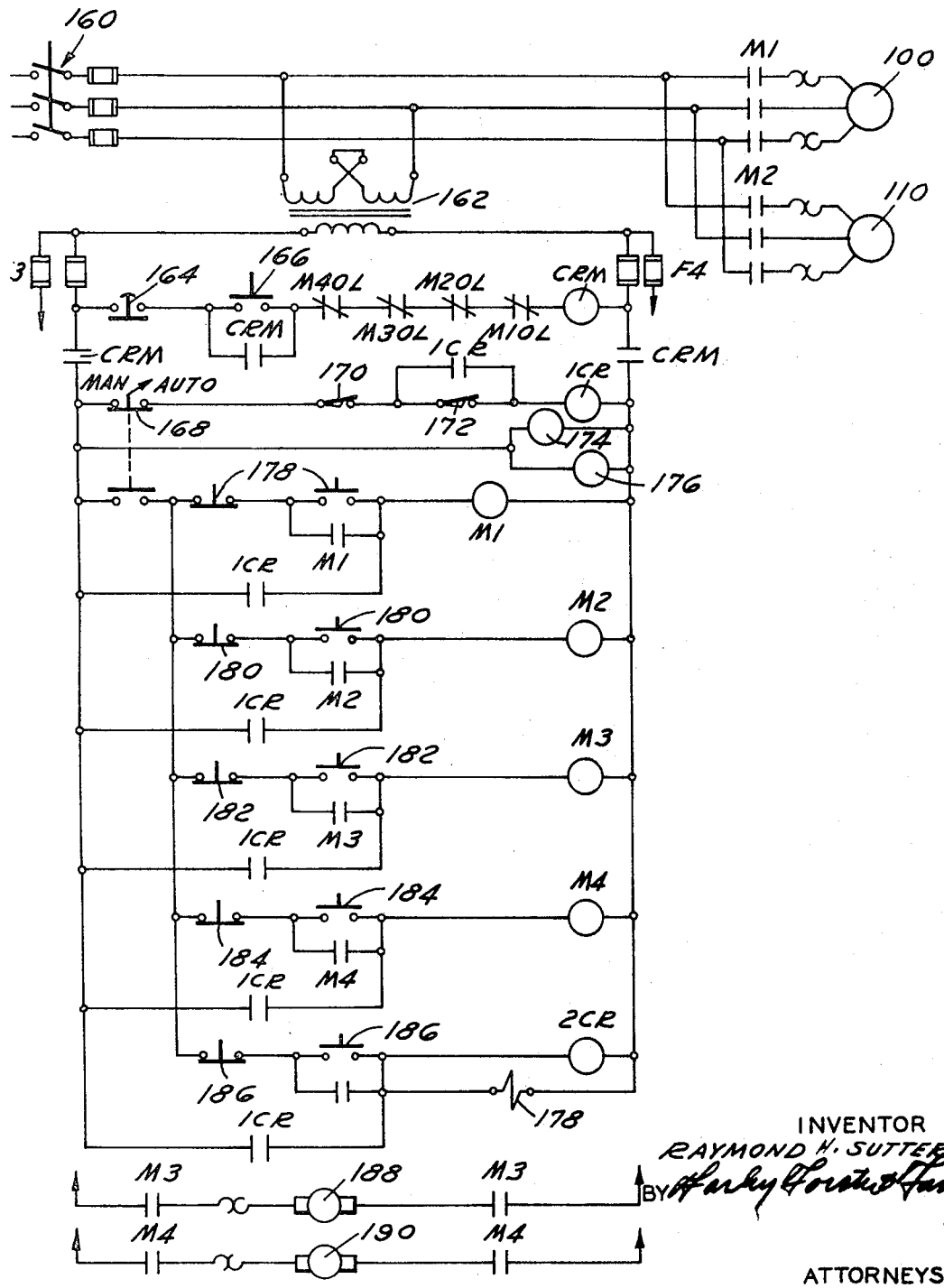
FIGURE 12 is a schematic diagram of the electrical control system employed in operating the sand mixing apparatus.

Referring again to FIGURE 1, the feed hopper 20 on the core blowing machine 12 is shown with a pair of "Bindicator" devices 154 and 156 for sensing the high and low levels of reserve core sand in the hopper for automatic control purposes. They are simple rotors on the ends of shafts each of which is free to rotate when the sand level falls below and which are arrested by the sand as its rises above them and causes a signal to other control means in the electrical circuit for the equipment disclosed and which is schematically shown in FIGURE 12.

A power source 160 is connected to one and a half horsepower 1800 r.p.m. feed screw drive motors 100 and 110 through relay operated contacts M1 and M2 and supply 115 v. to the rest of the system through a step-down transformer 162. A master stop switch 164 and start switch 166 are connected in series with normally closed overload relay contacts M40L-M10L and the control relay CRM which closes the relay CRM contacts across the start switch and in the two main legs of the control circuit.

With the selector switch 168 positioned for automatic operation, as shown, power is provided across the high level "Bindicator" contact switch 170 and a like level "Bindicator" contact 172, which are closed when their rotors are free to turn, to the automatic control relay 1CR. It is also provided to the "Bindicator" motors 174 and 176 and through relays 1CR to the top screw motor control relay M1, lower screw motor control relay M2, the resin pump control relay M3, the catalyst pump control relay M4 and the sand gate control valve solenoid 178 and control relay 2CR.

For manually controlled operation, to check out the equipment, etc., manually operated start and stop switches 178, 180, 182 and 184 are provided in series with the top screw control relay M1, bottom screw control relay M2, resin pump control relay M3 and catalyst pump control relay M4, respectively, and sand gate control switches 186 are provided in the 2CR relay circuit.

In operational use, the mixing and blending apparatus 10 is first checked out to be sure that the right amounts of resin and catalyst are being used for the particular type of core to be blown by the core blowing equipment 12 by using the manual circuit controls. With an acceptable ratio of resin and catalyst established, generally 2% by weight of resin and 20% catalyst for the sand being used, the demands of the core blowing equipment will automatically control the mixing and blending of core sand from its use upon positioning the selector switch 168 for automatic operation.

Assuming that the sand level in the hopper 20 on the core blowing equipment 12 is below the level of both "Bindicator" rotors, so that the automatic control relay 1CR is activated and the 1CR contact across the low level "Bindicator" control switch 172 is closed to maintain the circuit, both feed screw motors and both the resin and catalyst pumps will be in operation during the automatic cycle and the sand gate control valve 62 will be open to supply sand from the reservoir 64 to the two tubular members 38 and 40 for premixing and delivery to the lower tubular member.

As long as the core blowing equipment 12 draws on the blended core sand in the hopper 20 sufficiently to keep the reserve supply below the level of the upper "Bindicator" rotor, the supply from the sand, resin and catalyst reservoirs will remain open and the mixing and blending will continue. However, should the reserve supply of blended core sand rise enough to stop the high "Bindicator" rotor and open the relay switch 170 which provided power to the control relay 1CR, both feed screw motors and both pumps are inactivated and the sand gate control valve 62 is closed until the level in the reserve hopper 20 drops down below the low level "Bindicator" rotor 156.

When the core blowing equipment 12 is to be shut down, the sand mixing and blending apparatus may be set for manual operation, the top feed screw motor and the resin and catalyst pumps turned off and the bottom feed screw motor manually operated to discharge the blended mix so that it does not set up or deteriorate in "shelf life" in the lower tubular member.

From the foregoing, it will be seen that the equipment disclosed illustrates a foundry core sand blending system having means for controlling the regulated supply of sand, resin and catalyst for mixing in direct proportion and accord with the demand therefor by the equipment which uses it. A single core making machine making use of this system may have core sand provided to it with a minimum "shelf life" and the core sand may be blended to the requirements of the types of cores it is used to make.

There is no waste, no problem in delivery of dry sand, no loss in core strength because of large reserve supplies, and the mixing and blending equipment is easy to service and repair, if necessary, without affecting other equipment with like systems and with minimum down-time of its own.

I claim:

1. A supply on demand system for mixing foundry sand and the resin for foundry equipment as required, comprising:
 a reservoir source of foundry sand,
 a reservoir source of resin,
 means for mixing said foundry sand and resin,
 controllable means for supplying proportionate amounts of said sand and resin from said sources to said mixing means and for discharging the mixable sand and resin,
 foundry equipment including means for receiving mixed sand and resin discharged from the mixing means and supplying it to said foundry equipment as required,
 demand sensing means associated with the mixed sand and resin receiving means,
 and means for controlling the operation of said system in response to said demand sensing means.

2. The foundry sand and resin mixing system of claim 1, including:
 distinct separate mixing chambers in said mixing means for receiving sand and resin for mixing and from which sand and resin is supplied to the receiving means of said foundry equipment.

3. The foundry sand and resin mixing system of claim 2, including:
 separate drive means for moving sand for mixing and mixed sand and resin in said separate mixing chambers.

4. The foundry sand and resin mixing system of claim 2, including:
 a pair of mixing chamber in said mixing means for receiving sand for mixing and each connected to said separate mixed sand and resin supplying chamber.

5. The foundry sand and resin mixing system of claim 4, including:
 a reservoir for a catalyst,
 means for supplying said catalyst from said reservoir to one of said pair of mixing chambers,
 said source of resin being connected to the other of said sand mixing chambers,
 and said sand and resin being mixed with said sand and catalyst in said mixed sand and resin supplying chamber.

6. Apparatus mixing for blending foundry sand for use by foundry equipment including:
 separate reservoirs for sand, resin and catalyst to be mixed together to provide foundry core sand,
 a mixing means including three distinct separate mixing chambers adapted respectively to receive and mix sand and resin, sand and catalyst, and a confluent combination thereof in a common chamber for the blending of the separate mixes together to provide core sand,
 foundry equipment including means for receiving core sand from the common chamber of said mixing means,
 means for supplying sand and pre-regulated proportionate amounts of resin and catalyst to said mixing means,
 and means provided in said core sand receiving means adapted to control said supplying means in automatic response to the demand requirements of said foundry equipment for core sand.

7. The foundry sand mixing and blending apparatus of claim 6, said control means including high and low sand level sensing means, the said supplying means and said resin and catalyst supplying means being operatively responsive to start upon the sensing of low level and stop upon the sensing of high level.

8. The foundry sand blending appratus of claim 7, said sand reservoir including a feed hopper and having a chop-gate controlled orifice for the supply of sand therefrom:
 and said resin and catalyst supplying means including a positive displacement pump for the metered supply thereof operative only upon the opening of said sand supplying orifice and during the supply of sand therethrough.

9. The foundry sand blending apparatus of claim 8, including:
 means for separately regulating and measuring the metered flow of resin and catalyst to said mixing means.

10. Foundry sand mixing equipment, comprising:
 tubular sand mixing chambers having support housings provided near opposite ends thereof, said housings including passageways for supplying sand to and dispensing sand from opposite ends of said chambers,
 mixing feed screws provided in said chambers,
 mixing impeller blades on said feed screws adapted to control the degree of mixing and rate of delivery through said chambers, said chambers including at least two disposed in parallel spaced relation and having the feed screws therein for moving sand in the same direction therethrough,
 and a third chamber for receiving sand from first two and having the feed screw therein for moving sand in the opposite relative direction.

11. The foundry sand mixing equipment of claim 10, including:
 separate drive means for operating the feed screws in said first and last mentioned chambers.

12. The foundry sand mixing equipment of claim 10, including:
 means interconnecting the feed screws in said first two chambers for operation by a common drive means.

13. Foundry sand mixing equipment, comprising:
 tubular sand mixing chambers having support housings provided near opposite ends thereof, said housings including passageways for supplying sand to and dispensing sand from opposite ends of said chambers,
 mixing feed screws provided in said chambers,
 mixing impeller blades on said feed screws adapted to control the degree of mixing and rate of delivery through said chambers, said feed screws including a shaft having sets of impeller mixing blades provided in axially stacked and interchangeable alignment thereon.

14. The foundry sand mixing equipment of claim 13:
 sand impeller blade sets including a collar member keyed to said shaft and having a series of blades provided thereon,
 a certain of said sets having different blades axially disposed for use in varying the feed and mixing rate of said screws in service.

15. Apparatus for mixing and blending foundry sand, resin and catalyst for core making use, and comprising:
 separate reservoirs for sand, resin and catalyst,
 separate chambers having mixing means provided therein and including means connected to said reservoirs for supplying sand to each thereof and resin and catalyst separately to different thereof,
 a collective third chamber having its own mixing means and receptive of sand and resin and sand and catalyst mixtures from said first mentioned chambers for blending therein,
 core making foundry equipment having said apparatus provided thereon and including means for receiving the blended mixture from said collective chamber as required for use, and means operative of said supplying and mixing means responsive to the depletion of the blended mixture from said receiving means last mentioned for regulating the supply of core sand ingredients for mixing and blending in direct proportion to the use being made thereof.

References Cited

UNITED STATES PATENTS

| 770,855 | 9/1904 | Hetherington | 259—179 |
| 2,735,662 | 2/1956 | Wickland | 259—68 |
| 3,006,615 | 10/1961 | Mason | 259—154 |

ROBERT W. JENKINS, Primary Examiner